(12) United States Patent
Laricchiuta

(10) Patent No.: US 8,671,744 B1
(45) Date of Patent: Mar. 18, 2014

(54) ENGINE PULLEY TESTING DEVICE

(71) Applicant: Lawrence Andrew Laricchiuta, Farmingville, NY (US)

(72) Inventor: Lawrence Andrew Laricchiuta, Farmingville, NY (US)

(*) Notice: Subject to any disclaimer, the term of this patent is extended or adjusted under 35 U.S.C. 154(b) by 0 days.

(21) Appl. No.: 13/648,788

(22) Filed: Oct. 10, 2012

Related U.S. Application Data

(63) Continuation-in-part of application No. 12/981,087, filed on Dec. 29, 2010, now Pat. No. 8,307,701, which is a continuation-in-part of application No. 12/544,883, filed on Aug. 20, 2009, now Pat. No. 7,942,045.

(51) Int. Cl.
*G01M 15/00* (2006.01)

(52) U.S. Cl.
USPC ........................................... 73/114.77

(58) Field of Classification Search
USPC ........................................... 73/114.77
See application file for complete search history.

(56) References Cited

U.S. PATENT DOCUMENTS

| | | |
|---|---|---|
| 434,286 A | 8/1890 | Minot |
| 1,694,670 A | 12/1928 | Richards |
| 2,019,214 A | 10/1935 | Denny |
| 3,781,995 A | 1/1974 | Debeaux |
| 3,832,899 A | 9/1974 | Nicolau |
| 4,235,091 A | 11/1980 | Takano et al. |
| 4,480,487 A | 11/1984 | Kunzfeld |
| D319,987 S | 9/1991 | Ueno |
| 5,320,581 A | 6/1994 | Avery |
| 5,336,993 A | 8/1994 | Thomas et al. |
| 5,701,089 A | 12/1997 | Perkins |
| 5,752,891 A | 5/1998 | Meckstroth et al. |
| 5,780,731 A | 7/1998 | Matsui et al. |
| 6,301,978 B1 | 10/2001 | Sargent |
| 7,246,015 B2 | 7/2007 | Bertness et al. |
| 7,942,045 B1 | 5/2011 | Laricchiuta |
| 2006/0175484 A1 | 8/2006 | Wood, III et al. |
| 2011/0094322 A1 | 4/2011 | Laricchiuta |

*Primary Examiner* — Freddie Kirkland, III

(57) ABSTRACT

The present invention features an engine pulley testing device allowing a user to detect a damaged engine pulley. The engine pulley testing device comprises a first support arm and a second support arm pivotably attached to a front side of a top panel, a third support arm pivotably attached to a top panel on a back side of the top panel. A top pulley is attached on the top panel and a first bottom pulley and second bottom pulley are attached to the first and second support arms respectively. An engine belt can be wrapped around the pulleys and a testing pulley for testing. The engine pulley testing device may be attached on a sliding rail to slide to a desired working position.

15 Claims, 5 Drawing Sheets

ENGINE PULLEY TESTING DEVICE

CROSS REFERENCE

This application is a continuation-in-part of U.S. patent application Ser. No. 12/981,087 filed Dec. 29, 2010, which is a continuation-in-part of U.S. patent application Ser. No. 12/544,883 filed Aug. 20, 2009, the disclosures of which are incorporated herein by reference in their entirety.

FIELD OF THE INVENTION

The present invention is directed to a diagnostic device for automobiles. More particularly, the present invention is directed to a device for detecting worn engine pulleys.

BACKGROUND OF THE INVENTION

Various engine parts include one or more pulleys, all of which are driven by a single belt or chain. With time, the pulleys can begin rattling or squeaking, which can indicate the pulley is deteriorating. However, because a single belt operates all the pulleys, it is difficult to determine which pulley is deteriorating.

SUMMARY OF THE INVENTION

The present invention features an engine pulley testing device allowing a user to detect a damaged engine pulley. The engine pulley testing device comprises a first support arm and a second support arm pivotably attached to a front side of a top panel, a third support arm pivotably attached to a top panel on a back side of the top panel. A top pulley is attached on the top panel and a first bottom pulley and second bottom pulley are attached to the first and second support arms respectively. An engine belt can be wrapped around the pulleys and a testing pulley for testing. The engine pulley testing device may be attached on a sliding rail to slide to a desired working position.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
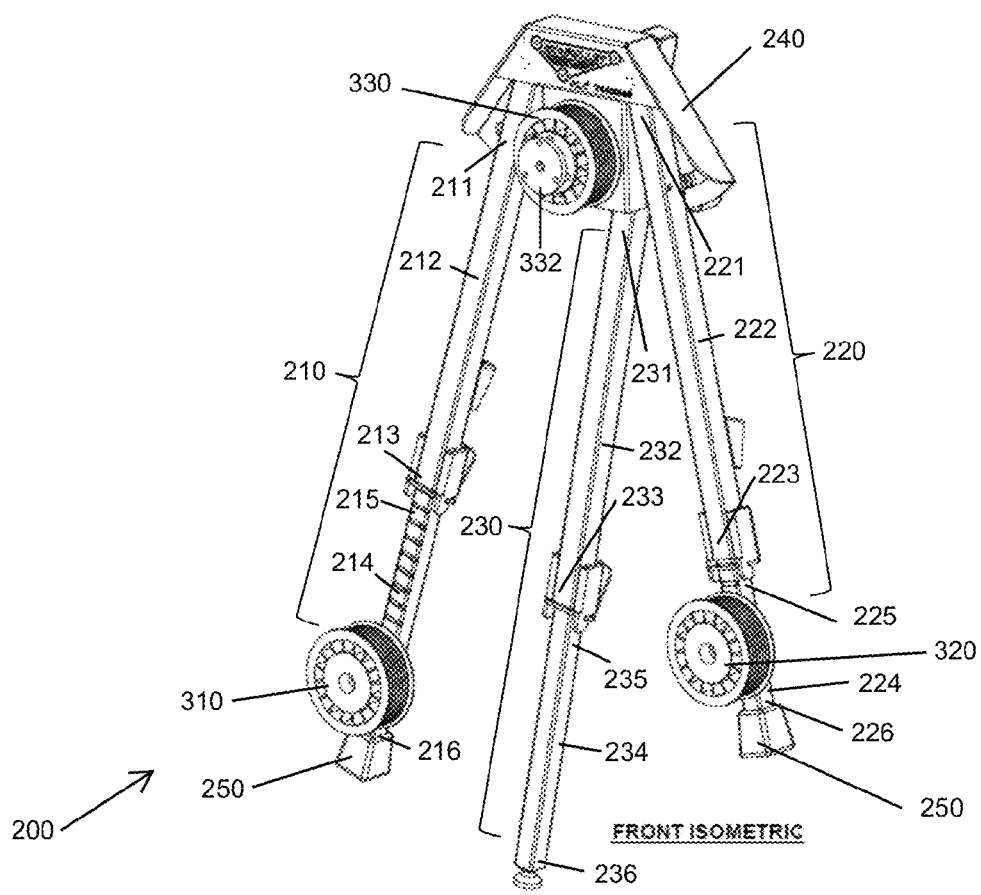
FIG. 1 shows a front isometric view of an engine pulley testing device.
Figure 2:
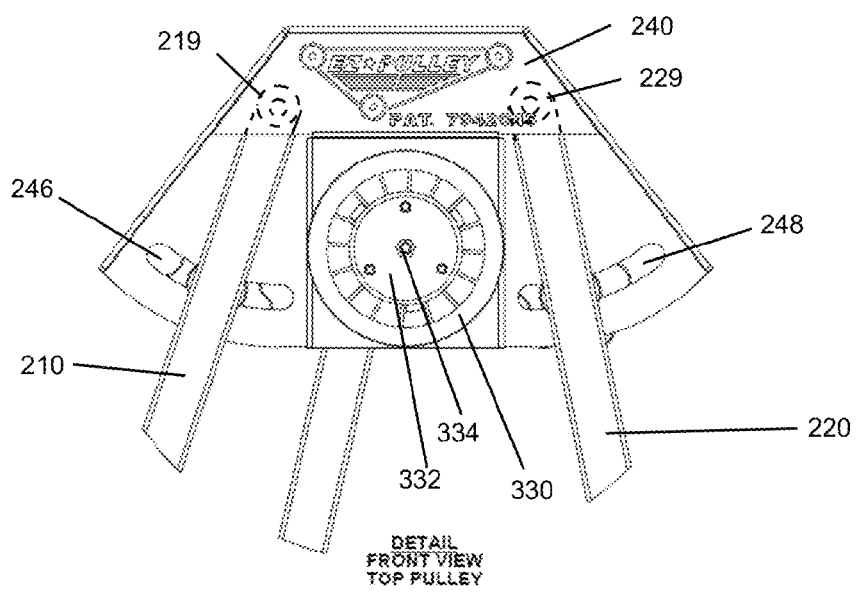
FIG. 2 shows a detailed front view of top pulley.
Figure 3:
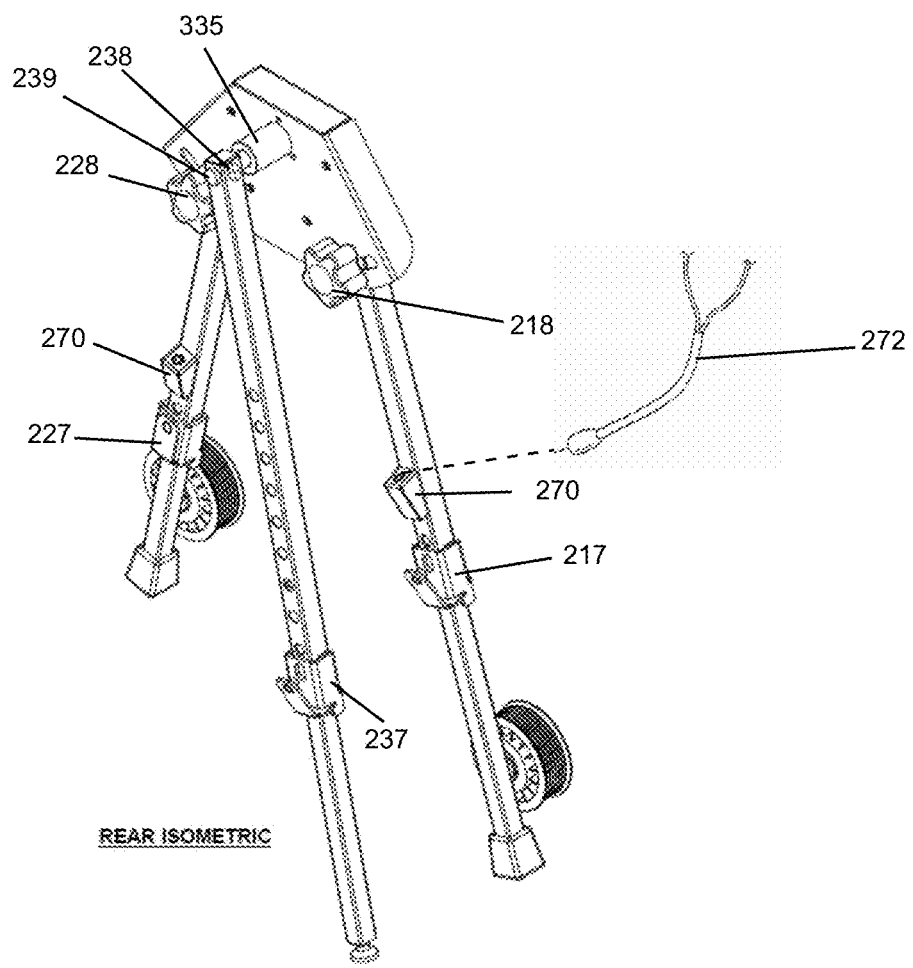
FIG. 3 shows a rear isometric view of the engine pulley testing device.
Figure 4:
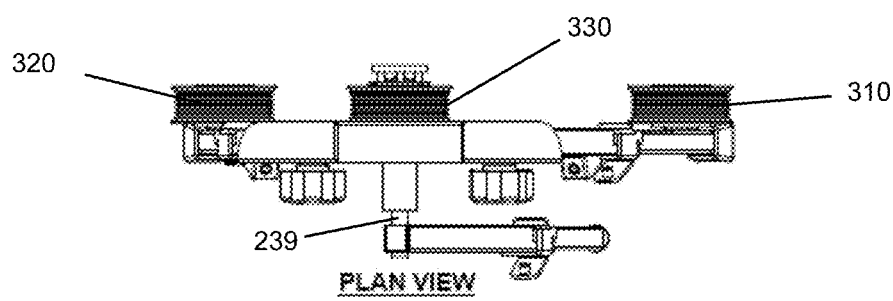
FIG. 4 shows a plan view of the engine pulley testing device.
Figure 5:
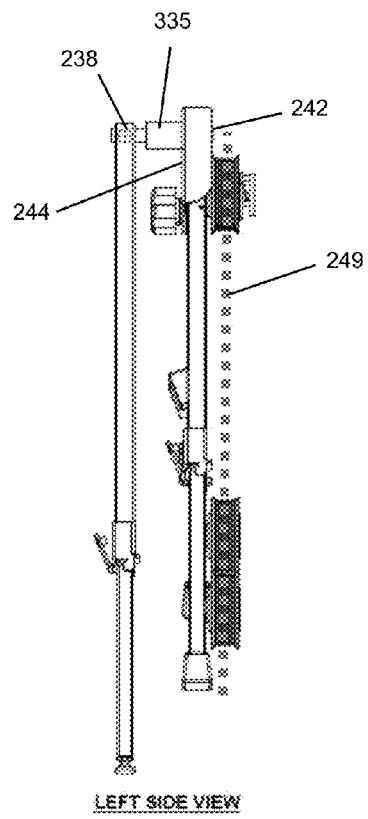
FIG. 5 shows a left side view of the engine pulley testing device.
Figure 6:
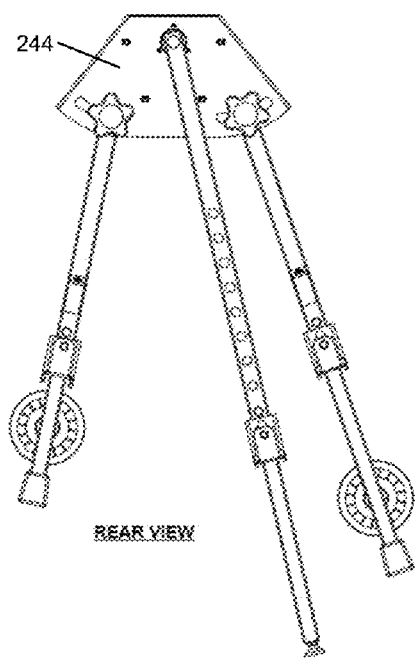
FIG. 6 shows a rear view of the engine pulley testing device.
Figure 7:
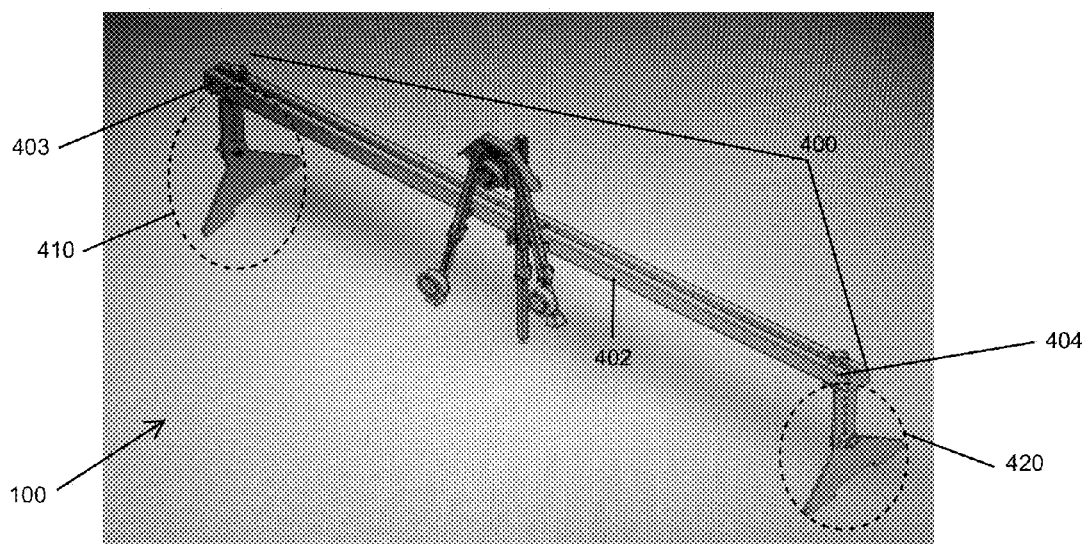
FIG. 7 shows an isometric view of the engine pulley testing device with a support platform.
Figure 8:
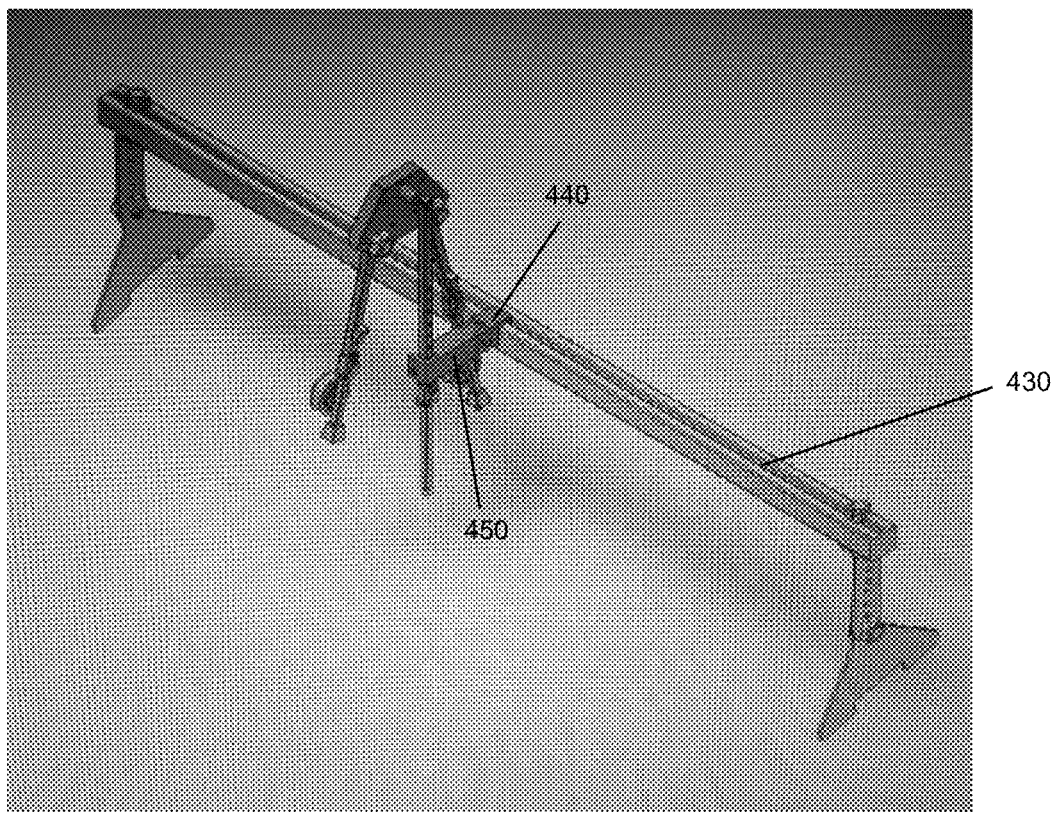
FIG. 8 shows an alternative isometric view of the engine pulley testing device with the support platform.
Figure 9:
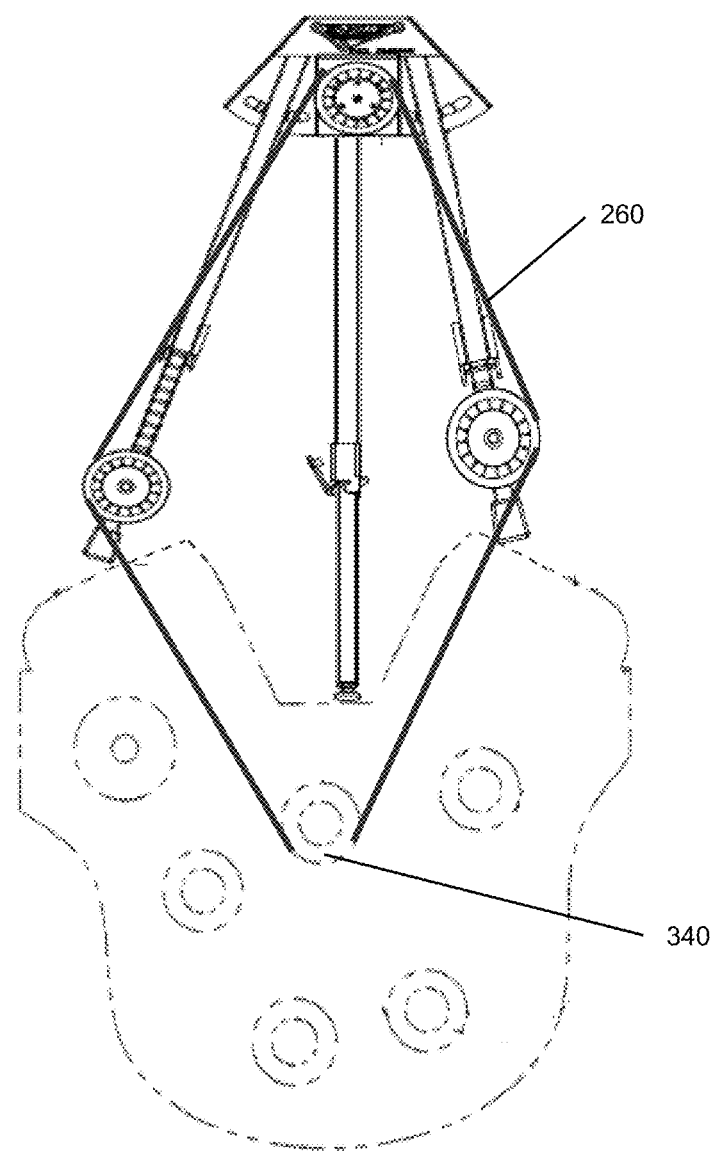
FIG. 9 shows an in-use view of the engine pulley testing device for the testing of a test pulley of an engine.

Referring now to FIG. 1-9, the present invention features an engine pulley testing system (100) used for allowing a user to detect a damaged engine pulley. The test system comprises an engine pulley testing device (200) and optionally a support platform (400).

The engine pulley testing device (200) comprises a top panel (240) having a front side (242) and a back side (244), a first support arm (210), a second support arm (220) and a third support arm (230), a top pulley (330), a first bottom pulley (310) and a second bottom pulley (320).

The first support arm (210), the second support arm (220) and the third support arm (230) are all pivotally attached to the top panel (240), wherein the first support arm and the second support arm (220) are attached on the front side (242) via a first pivot point (219) and a second pivot point (229) respectively, and the third support arm (230) is attached on the back side (244), wherein a first length of the first support arm (210), a second length of the second support arm (220) and a third length of the third support arm (230) are all adjustable; wherein the first support arm (210) is lockable with a first lock means (218) to secure a first support arm pivot angle, wherein the second support arm (220) is lockable with a second lock means (228) to secure a second support arm pivot angle, wherein the third support arm (230) is lockable with a third lock means (238) to secure a first support arm pivot angle.

The top pulley (330) is disposed on front side (242) of the top panel (240). The first bottom pulley (310) is rotatably attached to the first support arm (210), and the second bottom pulley (320) is rotatably attached to the second support arm (220), wherein the top pulley (320), the first bottom pulley (310) and the second bottom pulley (320) are on a same plane (249).

An engine belt (260) is wrapped around the top pulley (330), a test pulley (340) being tested in an engine and at least one of the first bottom pulley 510 and the second bottom pulley (320) during a pulley test, wherein the top pulley (330) and the test pulley (340) are on the same plane (249).

In some embodiments, the first support arm (210) comprises a first inner post (214) telescopically received in a first outer post (212), wherein the first inner post (214) can be locked in the first outer post (212) via a first post locking mechanism (217). In some embodiments, the second support arm (220) comprises a second inner post (224) telescopically received in a second outer post (222), wherein the second inner post (224) can be locked in the second outer post (222) via a second post locking mechanism (227). In some embodiments, the third support arm (230) comprises a third inner post (234) telescopically received in a third outer post (232), wherein the third inner post (234) can be locked in the third outer post (232) via a third post locking mechanism (237).

The length of the first support arm (210) is adjustable by moving the first inner post (214) in and out of the first outer post (212). In some embodiments, the length of the first support arm (210) is measured from the first end (211) of the first outer post (212) to the first end (216) of the first inner post (214). The length of the first support arm (210) can be locked via the first post locking mechanism (227).

The length of the second support arm (220) is adjustable by moving the second inner post (224) in and out of the second outer post (222). In some embodiments, the length of the second support arm (220) is measured from the first end (221)

of the second outer post (212) to the second end (226) of the second inner post (224). The length of the second support arm (220) can be locked via the second post locking mechanism (227).

The length of the third support arm (230) is adjustable by moving the third inner post (234) in and out of the third outer post (232). In some embodiments, the length of the third support arm (230) is measured from the first end (231) of the third outer post (232) to the third end (236) of the third inner post (234). The length of the third support arm (230) can be locked via the third post locking mechanism (237).

In some embodiments, the first post locking mechanism (217) is a bolt, wherein the second post locking mechanism (227) is a bolt, wherein the third post locking mechanism (237) is a bolt.

In some embodiments, the first arm lock means (218) is a bolt, wherein the second arm lock means (228) is a bolt, wherein the third arm lock means (238) is a bolt. In some embodiments, a gripping component (250) is disposed on a bottom end of the first support arm (210), a bottom end of the second support arm (220) and a bottom end of the third support arm (230). The gripping component (250) can be made of rubber or other friction enhancing materials.

In some embodiments, the third support arm (230) are attached on the back side (244), wherein the third support arm (230) is pivotally attached to the top panel (240) through a connection pole (239) with a ball joint such that bottom ends of the first support arm (210), the second support arm (220) and the third support arm (230) forms a stable tripod-style supporting structure.

In some embodiments, the top pulley (330) further comprises a adapter plate (332) fixably and coaxially attached to the top pulley (330), wherein the adaptor (332) has a receiver (334) disposed on the center of the plate (332) to operatively engage an external rotating source for driving the top pulley (330). In some embodiments, the receiver (334) is a hex dent, socket dent or torx dent. In some embodiments, the external rotating source is a power drill, cordless drill, or pneumatic drill.

In some embodiments, a motor (335) is disposed on the back side (244) of the top pane (240). The motor is configured to drive the top pulley (330) via internal gears or other mechanical coupling means. In some embodiments, the motor (335) is disposed on the connection pole (239).

In some embodiments, a stud (270) is disposed on either the first support arm (110) or the second support arm (220), wherein the stud (270) functions to engage a mechanic's stethoscope (272). Stethoscopes are well known to the ordinary people of the art.

In some embodiments, the top panel (240) have a first arc shaped slot (246) and a second arc shaped slot (248), wherein the first arc shaped slot (246) is functioned to limited pivot range of the first support arm (210), wherein the second arc shaped slot (248) is functioned to limited pivot range of the second support arm (220).

In some embodiments, the first support arm (210) is lockable to a first pivot angle with a first pivot lock means (218), wherein the second support arm (220) is lockable to a second pivot angle with a second pivot lock means (228), wherein the third support arm (230) is lockable to a third pivot angle with a third pivot lock means (238).

In some embodiments, the engine pulley testing system (100) further comprises a support platform (400), wherein the support platform (400) comprises a linear support rail (402) with a first rail end (403) and a second rail end (404), wherein a first support leg (410) is disposed on the first rail end and a second support leg (420) is disposed on the second rail end (404), wherein the first support leg (410) and the second support leg (420) have adjustable heights, wherein the third support arm (230) of the engine pulley testing device (200) is slidably attached to the support rail (402) between the first rail end (403) and the second rail end (404) through a rail connector (440).

In some embodiments, the third support arm (230) of the engine pulley testing device (200) is attached to the support rail (402) such that the plan of the top pulley (320), the first bottom pulley (310) and the second bottom pulley (320) is parallel or perpendicular to the rail (402). The third support arm (230) can be attached to the support rail (402) via a slide connector (440) or via an adaptor (450) and the slide connector (440). The slide connector (440) is configured to securely slide along the support rail (402) to provide a desired position for the testing device (200). In some embodiments, a groove (430) is disposed along the rail (402) between the first rail end (403) and the second rail end (404) through a rail connector (440). The slide connector (440) may be secured to any position along the rail (402) via a sliding secure means, such as a shim, a bolt, etc.

The disclosures of the following U.S. Patents are incorporated in their entirety by reference herein: U.S. Pat. No. 4,235,091; U.S. Pat. No. 5,780,731; U.S. Pat. No. 6,301,978 B1; U.S. Pat. No. 7,246,015 B2; U.S. Pat. No. 3,832,899; U.S. Pat. No. 5,336,993; U.S. Pat. No. 4,480,487; U.S. Pat. No. 5,701,089.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An engine pulley testing system (100) for testing a test pulley in an engine, said engine pulley testing system comprising:
   (i) an engine pulley testing device (200), wherein the device (200) comprises:
      (a) a top panel (240) having a front side (242) and a back side (244);
      (b) a first support arm (210), a second support arm (220) and a third support arm (230) pivotally attached to the top panel (240), wherein the first support arm and the second support arm (220) are attached on the front side (242) via a first pivot point (219) and a second pivot point (229) respectively, wherein a first length of the first support arm (210), a second length of the second support arm (220) and a third length of the third support arm (230) are all adjustable; wherein the first support arm (210) is lockable with a first arm lock means (218) to secure a first support arm pivot angle, wherein the second support arm (220) is lockable with a second arm lock means (228) to secure a second support arm pivot angle, wherein the third support arm (230) is lockable with a third arm lock means (238) to secure a first support arm pivot angle;

(c) a top pulley (330) disposed on front side (242) of the top panel (240), a first bottom pulley (310) rotatably attached to the first support arm (210), and a second bottom pulley (320) rotatably attached to the second support arm (220), wherein the top pulley (320), the first bottom pulley (310) and the second bottom pulley (320) are on a same plane (249);

wherein an engine belt (260) is wrapped around the top pulley (330), a test pulley (340) being tested in an engine and at least one of the first bottom pulley 510 and the second bottom pulley (320) during a pulley test, wherein the top pulley (330) and the test pulley (340) are on the same plane (249).

2. The system of claim 1, wherein the first support arm (210) comprises a first inner post (214) telescopically received in a first outer post (212), wherein the first inner post (214) can be locked in the first outer post (212) via a first post locking mechanism (217).

3. The system of claim 1, wherein the second support arm (220) comprises a second inner post (224) telescopically received in a second outer post (222), wherein the second inner post (224) can be locked in the second outer post (222) via a second post locking mechanism (227).

4. The system of claim 1, wherein the third support arm (230) comprises a third inner post (234) telescopically received in a third outer post (232), wherein the third inner post (234) can be locked in the third outer post (232) via a third post locking mechanism (237).

5. The system of claim 1, wherein the first arm lock means (218) is a bolt, wherein the second arm lock means (228) is a bolt, wherein the third arm lock means (238) is a bolt.

6. The system of claim 1, wherein a gripping component (250) is disposed on a bottom end of the first support arm (210), a bottom end of the second support arm (220) and a bottom end of the third support arm (230).

7. The system of claim 1, the third support arm (230) are attached on the back side (244), wherein the third support arm (230) is pivotally attached to the top panel (240) through a connection pole (239) such that bottom ends of the first support arm (210), the second support arm (220) and the third support arm (230) forms a stable tripod-style supporting structure.

8. The system of claim 1, wherein the top pulley (330) further comprises a adapter plate (332) fixably and coaxially attached to the top pulley (330), wherein the adaptor (332) has a receiver (334) disposed on the center of the plate (332) to operatively engage an external rotating source for driving the top pulley (330).

9. The system of claim 8, wherein the receiver (334) is a hex dent, socket dent or torx dent.

10. The system of claim 8, wherein the external rotating source is a power drill, cordless drill, or pneumatic drill.

11. The system of claim 1, wherein a stud (270) is disposed on either the first support arm (110) or the second support arm (220), wherein the stud (270) functions to engage a mechanic's stethoscope (272).

12. The system of claim 1, wherein the top panel (240) have a first arc shaped slot (246) and a second arc shaped slot (248), wherein the first arc shaped slot (246) is functioned to limited pivot range of the first support arm (210), wherein the second arc shaped slot (248) is functioned to limited pivot range of the second support arm (220).

13. The system of claim 1, wherein the first support arm (210) is lockable to a first pivot angle with a first pivot lock means (218), wherein the second support arm (220) is lockable to a second pivot angle with a second pivot lock means (228), wherein the third support arm (230) is lockable to a third pivot angle with a third pivot lock means (238).

14. The system of claim 1, wherein the system further comprises a support platform (400), wherein the support platform (400) comprises a linear support rail (402) with a first rail end (403) and a second rail end (404), wherein a first support leg (410) is disposed on the first rail end and a second support leg (420) is disposed on the second rail end (404), wherein the first support leg (410) and the second support leg (420) have adjustable heights, wherein the third support arm (230) of the engine pulley testing device (200) is slidably attached to the support rail (402) between the first rail end (403) and the second rail end (404) through a rail connector (440).

15. The system of claim 12, wherein the third support arm (230) of the engine pulley testing device (200) is attached to the support rail (402) such that the plan of the top pulley (320), the first bottom pulley (310) and the second bottom pulley (320) is parallel or perpendicular to the rail (402).

* * * * *